United States Patent
Dey et al.

(10) Patent No.: US 10,726,465 B2
(45) Date of Patent: Jul. 28, 2020

(54) SYSTEM, METHOD AND COMPUTER PROGRAM PRODUCT PROVIDING EYE TRACKING BASED COGNITIVE FILTERING AND PRODUCT RECOMMENDATIONS

(71) Applicant: International Business Machines Corporation, Armonk, NY (US)

(72) Inventors: Kuntal Dey, New Delhi (IN); Vijay Ekambaram, Tamilnadu (IN); Seema Nagar, Bangalore (IN); Swati Rallapalli, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 15/079,731

(22) Filed: Mar. 24, 2016

(65) Prior Publication Data
US 2017/0278172 A1    Sep. 28, 2017

(51) Int. Cl.
*G06Q 30/00* (2012.01)
*G06Q 30/06* (2012.01)
*G06K 9/00* (2006.01)

(52) U.S. Cl.
CPC ..... *G06Q 30/0631* (2013.01); *G06K 9/00597* (2013.01); *G06Q 30/0633* (2013.01)

(58) Field of Classification Search
None
See application file for complete search history.

(56) References Cited

U.S. PATENT DOCUMENTS

2007/0066916 A1    3/2007    Lemos

2008/0065468 A1 *  3/2008    Berg et al. ............. G06Q 30/00
                                                                 705/10
(Continued)

FOREIGN PATENT DOCUMENTS

CN    102800006 A    11/2012
CN    103258020 A     8/2013
(Continued)

OTHER PUBLICATIONS

Bowen, R. B. (2016). Development of dynamic testing methods using facial expression analysis to evaluate packaging design in a realistic shopping environment (Order No. 10152088). Available from ProQuest Dissertations and Theses Professional. (Year: 2016).*

(Continued)

*Primary Examiner* — Marissa Thein
*Assistant Examiner* — Ashley D Preston
(74) *Attorney, Agent, or Firm* — Harrington & Smith (57) ABSTRACT

A method inputs to a data processing system biometric data (e.g., eye movement data) generated for a user when the user selects displayed items for purchase. The method further includes operating the system to determine a set of items having at least one member item, not specifically selected to purchase by the user, as being of potential interest to the user when the user makes a final purchase decision; evolving items that are members of the set of items in response to continued reception of the biometric data; and presenting member items from the set of items to the user for consideration to purchase prior to the user making the final purchase decision. The user selected item to purchase is placed into a primary shopping cart and the items from the set of items are placed into a secondary shopping cart for display to the user at checkout time.

20 Claims, 3 Drawing Sheets

(56) References Cited

U.S. PATENT DOCUMENTS

| | | | |
|---|---|---|---|
| 2009/0164131 | A1 | 6/2009 | Jung et al. |
| 2013/0030950 | A1 | 1/2013 | Jung et al. |
| 2013/0198030 | A1* | 3/2013 | Linden et al. ..... G06Q 30/0631 705/26.7 |
| 2013/0317939 | A1* | 11/2013 | Urbanski et al. ...... G06Q 30/00 705/26.8 |
| 2014/0040006 | A1 | 2/2014 | Balestrieri et al. |
| 2014/0068649 | A1 | 3/2014 | Badros et al. |
| 2014/0323817 | A1 | 10/2014 | el Kaliouby et al. |

FOREIGN PATENT DOCUMENTS

| | | |
|---|---|---|
| CN | 103617540 A | 3/2014 |
| CN | 102402765 A | 4/2014 |
| CN | 103886074 A | 6/2014 |
| WO | 2014/143024 A1 | 9/2014 |

OTHER PUBLICATIONS

Hannaford, A. (Apr. 14, 2013). Why you buy what you buy: Advertisers have long used science to peer into consumers' brains; today 'neuromarketing' has given them the power to delve into our subconscious. The Sunday Telegraph Retrieved from http://dialog.proquest.com/professional/docview/1326573808 (Year: 2013).*

"Saccadic Eye Movement Tag A Better Predictor of Product Success", http://pretesting.com/blog/tag/saccadic-eye-movement/ downloaded Mar. 4, 2016.

R. A. Khan, et al., "Framework for Reliable, Realtime Facial Expression Recognition for Low Resolution Images", Pattern Recognition Letters, Elsevier, 2013, 34 (10), pp. 1159-1168, 10.1016/j.patrec.2013.03.022, hal-00817293.

Ira Cohen, et al., "Facial Expression Recognition from Video Sequences", Journal Computer Vision and Image Understanding—Special issue on Face recognition archive, vol. 91, Issue 1-2, Jul. 2003, pp. 160-187.

Rallapalli, Swati, et al., "Enabling Physical Analytics in Retail Stores Using Smart Glasses", MobiCom '14, Sep. 7-11, 2014, ACM Maui, HI, USA, 12 pgs.

Puolamaki, Kai, et al., "Combining Eye Movements and Collaborative Filtering for Proactive Information Retrieval", SIGIR '05, Aug. 15-19, 2005, Salvador, Brazil, 8 pgs.

Martinez, Aleix, et al., "A Model of the Perception of Facial Expressions of Emotion by Humans: Research Overview and Perspectives", Journal of Machine Learning Research 13 (2012), pp. 1589-1608.

Liu, Nathan N., et al., "Unifying Explicit and Implicit Feedback for Collaborative Filtering", Proceeding CIKM '10 Proceedings of the 19th ACM International Conference on Information and Knowledge Management, Toronto, ON, Canada, Oct. 26-30, 2010, pp. 1445-1448.

Lhommet, Margaux, et al., "Expressing Emotion Through Posture and Gesture" a chapter from The Oxford Handbook of Affective Computing, Edited by Rafael Calvo et al., Print Publication Date: Jan. 2015, Online Publication Date: Jul. 2014, 21 pgs.

* cited by examiner

SYSTEM, METHOD AND COMPUTER PROGRAM PRODUCT PROVIDING EYE TRACKING BASED COGNITIVE FILTERING AND PRODUCT RECOMMENDATIONS

TECHNICAL FIELD

The embodiments of this invention relate generally to systems, methods and computer program products that enable biometric sensing of a user while viewing products for potential purchase and, more specifically, relate to systems and methods that involve monitoring and tracking movements and other changes in a person's eyes in a product viewing environment.

BACKGROUND

The use of eye movement sensors and similar apparatus in an online retail sales and an offline retail sales context is known in the art for attempting to gauge a person's focus on and engagement with one or more products. While providing some utility the currently existing approaches leave a number of needs unfulfilled.

SUMMARY

In a first non-limiting aspect thereof the embodiments of this invention provide a method that comprises inputting to a data processing system biometric data generated for a user in an environment wherein the user selects one or more displayed items for purchase, where the biometric data is comprised of at least eye-related data of the user; operating the data processing system to determine a set of items comprised of at least one member item, not specifically selected to purchase by the user, as being of potential interest to the user when the user makes a final purchase decision; evolving over time items that are members of the set of items in response to continued reception of the biometric data; and presenting member items from the set of items to the user for consideration to purchase prior to the user making the final purchase decision.

In another non-limiting aspect thereof the embodiments of this invention provide a system comprised of at least one data processor connected with at least one memory that stores software instructions. In the system execution of the software instructions by the at least one data processor causes the system to input biometric data generated for a user in an environment wherein the user selects one or more displayed items for purchase, where the biometric data is comprised of at least eye-related data of the user; determine a set of items comprised of at least one member item, not specifically selected to purchase by the user, as being of potential interest to the user when the user makes a final purchase decision; evolve over time items that are members of the set of items in response to continued reception of the biometric data; and present member items from the set of items to the user for consideration to purchase prior to the user making the final purchase decision.

In yet another non-limiting aspect thereof the embodiments of this invention provide computer program product comprised of software instructions on a computer-readable medium. Execution of the software instructions using a data processing system results in performing operations comprising inputting to the data processing system biometric data generated for a user in an environment wherein the user selects one or more displayed items for purchase, where the biometric data is comprised of at least eye-related data of the user; operating the data processing system to determine a set of items comprised of at least one member item, not specifically selected to purchase by the user, as being of potential interest to the user when the user makes a final purchase decision; evolving over time items that are members of the set of items in response to continued reception of the biometric data; and presenting member items from the set of items to the user for consideration to purchase prior to the user making the final purchase decision.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention.

When reading text the majority of a person's eye movements are forward movements with respect to word order (referred to as saccades), while some percentage of eye movements (e.g., about 25% or less) are in a direction opposite to word order (referred to as regressions). These eye movements, saccades and regressions, as well as others are detectable using image capture techniques.

A person's emotional state can be detected using sensors, such as a video camera that generates image data of facial expressions, body posture and gestures. Audio information representative of a person's speech that is captured by a microphone might also be employed to determine emotional state, as can physiological information such as skin temperature and galvanic resistance. Various machine learning techniques can be used to process the captured sensor data in order to derive an estimate of the person's current emotional state (e.g., calm, excited, happy, sad, etc.)

The embodiments of this invention provide a system and associated methods and computer programs, including tangibly embodied computer programs, to perform cognitive filtering for dynamic product recommendation based upon biometric inputs such as eye focus and eye movement behavior of a user, and possibly one or more other users. The other user or users can include, for example, social media friends of the user. The eye focus and eye movement behavior of the user is monitored in the context of a physical product or a representation of a product (e.g., an image of the product such as one displayed on a web page or by an application). The embodiments of this invention pertain in part to offline presentations of products, such as in retail stores and other locations. The embodiments of this invention can also pertain at least in part to observations of emotional reactions of a user. These possible various inputs to a cognitive filter method and apparatus result in generation of at least one product recommendation, where the recommendation can evolve with time within a given product browsing session in a digital setting (e.g., online) and/or in a physical setting.

The methods and apparatus in accordance with exemplary embodiments of this invention can include use of a sequence of one or more of temporal collaborative filtering and temporal social filtering that, as a whole, form the basis of cognitive filtering. This can include detecting eye focus parameters of a user to given objects on one or more web pages and application (app) pages by using gaze tracking equipment such as a camera and/or a webcam and/or glasses. The cognitive filtering can also involve and comprise detecting emotional state (e.g., happy/unhappy) and the evolution of emotional state while viewing a product or a representation of a product.

The methods and apparatus can also include use of detection of eye focus parameters on offline objects such as products with known brands/models in a retail store, and detection of emotional state and the evolution of emotional state.

Temporal collaborative filtering, as an example of one component of cognitive filtering, can include using this information, and appropriate thresholds, to categorize items based upon an amount of time that a user spends looking at a product (different quanta of "seen long enough"), and can make the product a candidate for a temporal collaborative filtering-based product recommendation.

Temporal social filtering, as another example of one component of cognitive filtering, can include making a recommendation of a product by also incorporating viewing behavior and emotional reactions of acquaintances, such as friends, of the user who view the physical product or browse an online catalog containing the product.

One aspect and result of the cognitive filtering operations can be the creation of a "secondary shopping cart". As considered herein the secondary shopping cart can be considered to be a set of or a list of potential products of interest to the user. The list of potential products of interest can be based at least in part upon the viewing user's cognitive reactions during a browsing session and/or the user's reactions while viewing the physical product, possibly enhanced with the reactions of the social acquaintances of the user. The secondary shopping cart may be employed, for example, for cross-sell and up-sell purposes during an online checkout procedure conducted by the user.

The embodiments of this invention can take advantage of various systems available on various user devices, such as mobile phones/tablets and laptop/desktop computers, to detect and record eye movements relative to a viewing screen and parameters of eye movements such as saccades, fixations, regressions and scan paths. This can be accomplished by using existing systems that are capable of, by example, mapping the user's eye focus coordinates (x,y) at a point of focus onto images, videos and text (words) shown on a screen. The embodiments of this invention can also employ, for example, machine learning techniques to ascertain emotions from images of human faces using certain defining attributes (e.g., the shape of the mouth). The embodiments of this invention can also employ, for example, collaborative filtering-based and social network-based product recommendations. The embodiments of this invention can use data exchange technologies across applications, and from wearable devices such as electronically enhanced glasses, watches and rings, to some base mobile or tablet device or, more generally, some computer-like device employed by the user. The embodiments of this invention can optionally employ systems capable of identifying items in stores using, for example, logos, bar codes and/or racks (physical locations of products within a given store), and extracting the brands and models of the items.

The embodiments of this invention enhance and extend current practice by taking advantage of additional information such as, but not limited to, eye movement behavior and eye fixation patterns of users on online web pages, an amount of attention (eye focus) that a given product (brand and model) receive from users while they roam in physical retail stores, and a per-item focus that a user gives to individual items on given product catalogue pages (such as, staring at images, looking carefully at descriptions of one or more specific products among some multiple products shown on a catalogue page and/or reading the review of a certain product multiple times). The embodiments of this invention can also use and take advantage of a user's emotional state and its evolution over time while the user views a product or a description of a product (e.g., views an image of the product in an online environment or views the actual product in a retail shop environment). The embodiments of this invention can also correlate the user's emotional states with the user's product viewing behavior. A goal of these procedures is to improve the state of the art and provide collaborative filtering and social network-based product recommendations that can be carried out online.

Figure 1:
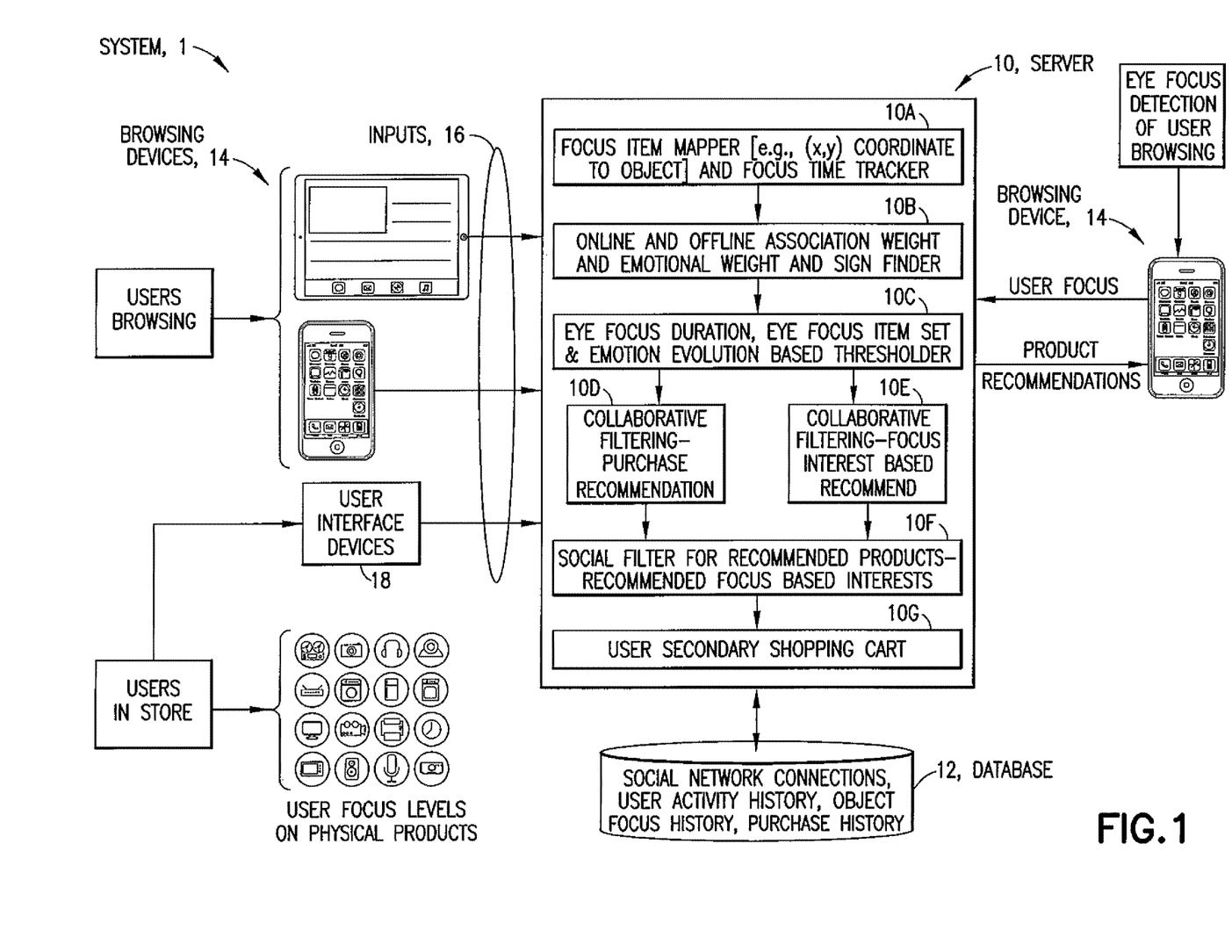
FIG. 1 illustrates in block diagram form a non-limiting embodiment of a system that is constructed and operated in accordance with this invention.

Reference is made to FIG. 1 for showing a diagram of a non-limiting embodiment of a system 1 that is constructed and operated in accordance with this invention. In the illustrated embodiment the system 1 includes a server 10 bidirectionally connected with a data storage system that can be embodied as a database 12. The database 12 can store for individual ones of a population of users at least, for example, user social network connections, user activity history, user object focus history and/or user purchase history.

The server 10 also includes interfaces and adapters (shown in FIG. 2) for connecting with various types of user electronic devices including, but not limited to, internet browsing devices 14 such as mobile phones (e.g., smartphones), tablets, desktop computers or portable computers such as laptop computers. The browsing devices 14 are connected to the interfaces and adapters of the server 10 via various inputs 16. The inputs 16 can be one or more of wired inputs and wireless inputs such as, but not limited to, wired or wireless local area networks (WLAN) including, as non-limiting examples, Ethernet, IEEE 802.11 wireless networks, near field communication (NFC) wireless networks, Bluetooth™ wireless networks and/or wide area networks (WAN) such as cellular communication networks. The system 1 can also include (optional) user interface devices 18 such as wearable user interface devices including, for example, glasses containing imaging and communication devices and circuitry that are directly connectable to the server 10 via suitable input(s) 16, or that are connectable to the server 10 via an intermediary device such as the user's smartphone or tablet. The user interface devices 18 can be employed while the user is in a store or shop to record user focus levels when viewing physical products. In some embodiments the (optional) user interface devices 18 could be installed in the store or shop as imaging devices configured to view the user's eyes and possibly face when the user is looking at physical products, and also possibly associated descriptive literature, on store shelves and displays.

In general the browsing devices 14 and the user interface devices 18 are assumed to include some type or types of biometric sensors/systems that are responsive to the user's eyes and/or facial expressions and/or emotional state. The biometric sensors/systems can in many instances comprise at least one camera and associated software configured to process images captured by the camera.

An output of the server 10 is at least one product recommendation to the user's browsing device 14, where the product recommendation(s) is based in whole or in part on the data received from the biometric sensor(s) while the user is online viewing images of products and/or while the user is in a store and viewing actual products. The product recommendation(s) can also be based at least in part on data obtained from persons associated in some way to the user (e.g., friends, family) via one or more social network connections. The product recommendation(s) can also be based at least in part on the user activity history, the user object focus history and/or the user purchase history (e.g., data retrievable from the database 12). These product recommendation(s) can be considered to represent and/or populate the above-mentioned secondary shopping cart.

The server 10 can be physically instantiated as one or more computers and computing systems at an enterprise, such as an online and/or an offline retailer or a marketing firm, or it can be instantiated in whole or in part in a virtual manner in the cloud. Whatever physical/virtual form the server 10 assumes it can be assumed to include certain cooperating functionality that is responsive to biometric-derived data received via the inputs 16 and associated interfaces and adapters. This cooperative functionality can include, for example, the following components that can be realized as physical components/circuitry and/or as executable program code.

10A: A focus item mapper receives from the user's browsing device a user's (x,y) gaze coordinates and maps the received user's (x,y) gaze coordinates to a spatial location of an object, while focus time tracker records a length of time that the user focuses on a particular object (e.g., a length of time that the user's (x,y) gaze coordinates remain substantially constant). It can be noted that the object focused on can be represented as an image displayed on a screen of the browsing device 14 or the object focused on can be a physical product located on a store shelf or in a store window.

The server 10 can obtain knowledge of what was on the screen of the user's browsing device 14 and correlate the received gaze coordinates to some displayed product via a mapping. For example, with a mobile application it is possible to associate an identifier with a product, determine the screen coordinates within which the product was displayed and then map the gaze (x,y) coordinate to an object thus positioned on the screen. On a laptop/desktop computer, while such a mapping is generally not as readily available, it is possible to find the item displayed at a given coordinate by calculating the browser's screen coordinates, and the object's (image, etc.) coordinates within the browser.

10B: This function implements an online and offline association weight and emotional weight and sign finder. The sign of a user's emotional response to a viewed product representation (e.g., image displayed on the screen of the browsing device 14) or to a physical product can be considered as +/−, where + correlates with a positive emotional response and where − correlates with a negative emotional response. In some cases the user's emotional response may be essentially neutral, i.e., neither strongly positive nor strongly negative. The more positive or negative the user's emotional response to a particular product is the larger is the magnitude (+ or −) of the emotional response.

10C: An eye focus duration, eye focus item set and emotion evolution-based thresholder function determines, based on how long the user maintains the eyes focused on a particular object, whether the focus duration exceeds some threshold value to qualify as indicating that the user is actually focused on the object. This function also is responsible for tracking in time the user's perceived emotional response to the object (positive, negative, neutral) and how the user's emotional response changes (evolves) over time.

The cooperative functionality of the server 10 can also include:

10D, 10E: A collaborative filtering-purchase recommendation function and a collaborative filtering-focus interest based recommendation function. These two collaborative filtering functions may be assumed to operate essentially in parallel to process and filter the biometric derived user data (function 10D) and to process and filter other user data (function 10E, focus interest based recommendations).

The cooperative functionality of the server 10 can also include:

10F: A social filter for recommended products-recommended focus based interests function processes the outputs of the functions 10D and 10E and considers the user's social sphere (social network connections), e.g., have any persons socially associated with the user previously recommended or purchased a potential product of interest to the user?

The cooperative functionality of the server 10 also includes:

10G: A function that constructs the secondary shopping cart for the user, where the secondary shopping cart is populated with one or more products (or services) that may be of interest to the user based on the result of the processing of the user's biometric data and social data by the functions 10A through 10F, in cooperation with data retrieved from the database 12. This secondary shopping cart of product recommendations can be presented to the user when the user checks out an item or items that the user has added to a conventional, primary shopping cart. This gives the user the opportunity to decide if any of the recommended product or products added to the user's secondary shopping cart are actually determined by the user to be desirable and worth purchasing, thereby enabling the user to include one or more of the recommended products in the primary shopping cart at checkout time.

In some embodiments it may be assumed that the server 10 can obtain federated data from third parties to acquire social network information related to the user. The federated data can be obtained via a meta-database management system (DBMS) that transparently maps multiple autonomous database systems into a single federated database. In other embodiments the online shopping platform itself can have native social networking capabilities and, in this case, the social network data related to the user can be obtained directly. The federated database could be a part of the database 12 or it could be a separate database that is accessed, for example, online.

In general the server 12 can be located as part of a backend system of an online store/retailer and, thus, can directly add items into the secondary shopping cart and dynamically update what is sent to the user as recommended items. As a non-limiting example of an implementation, an AJAX (Asynchronous Javascript and XML) call/request, sometimes referred to as an XHR (XmlHttpRequest), can be used for this purpose.

Figure 2:
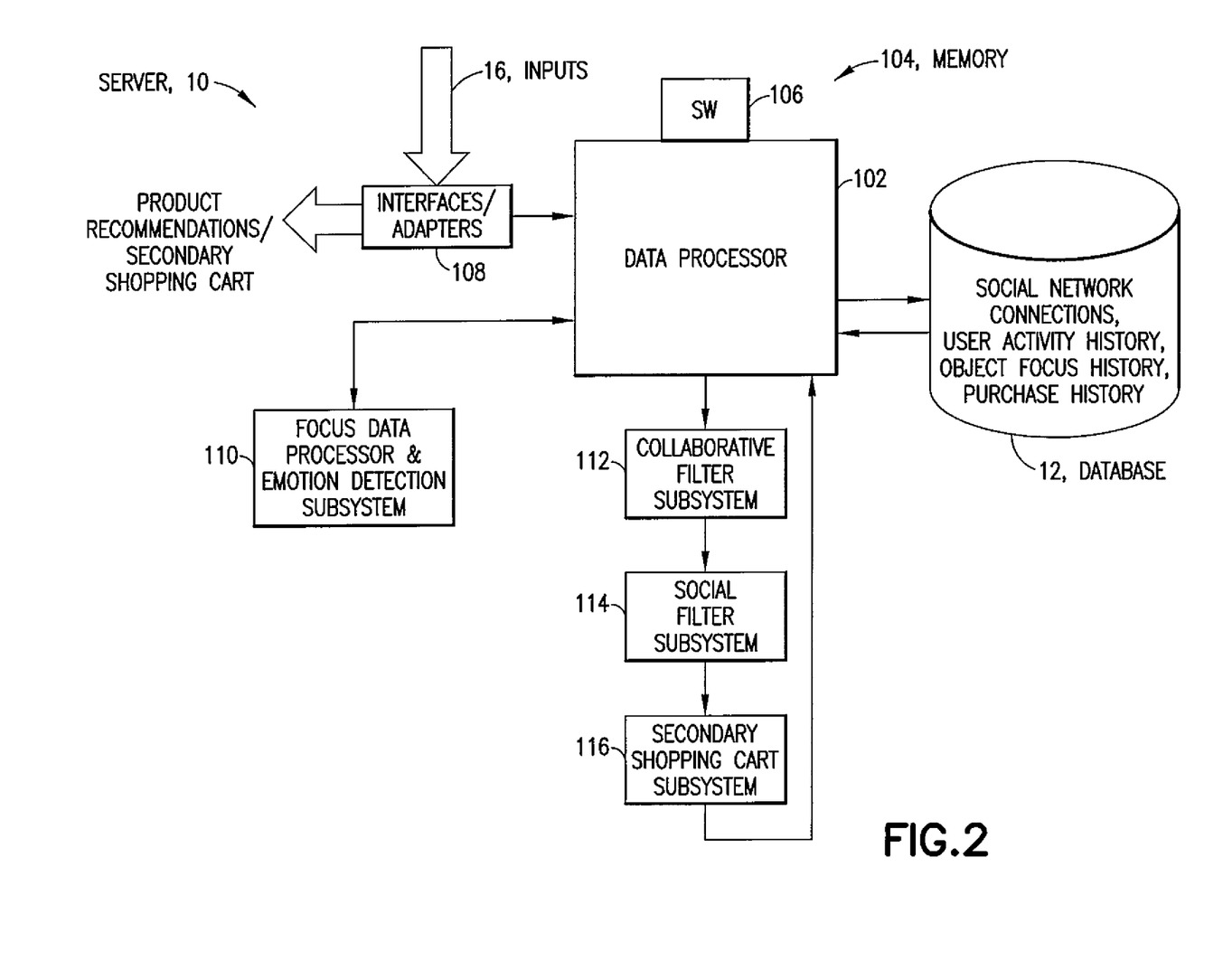
FIG. 2 is a block diagram of the server shown in FIG. 1.

FIG. 2 is a block diagram of the server 10 shown in FIG. 1. The server 10 includes at least one controller/data processor 102 connected with at least one memory that stores software (SW) 106, and is also connected with the database 12. The data processor 102 is also connected with interfaces/adapters 108 that are configured to receive the various inputs 16 from the user browsing devices 14 and the (optional) user interface devices 18. Connected with the data processor 102 are a number of sub-systems that implement the functions 10A-10G shown in FIG. 1. One sub-system is a focus data processor and emotion detection sub-system 110 that operates on gaze-related and other biometric (e.g., eye and/or face image data) from the user's browsing device 14 to implement the functions 10A-10C. A collaborative filter sub-system 112 implements functions 10D and 10E and operates at least in part on the processed user focus/emotional data. Following the collaborative filter sub-system 112 is a social filter sub-system 114 that implements the function 10F and a user secondary shopping cart sub-system that implements the function 10G. Data representing the determined secondary shopping cart for a particular user is output to the user's browsing device 14 by the data processor 102 via an appropriate one of the interfaces/adapters 108. The various sub-systems 110-116 can be implemented in whole or in part as circuitry and/or as separate special purpose data processor/controllers and/or as the software 112.

The use of the embodiments of this invention enable collaborative filtering and social network based filtering for product recommendation based at least in part upon temporally evolving eye focus and eye movement behavior of a current user and other users (including acquaintances, family, friends of the current user) relative to a product, which can be represented as an image of the product displayed from an online catalog that is provided to the user's browsing device 14 from an online store/merchant. The product recommendation can also be based at least in part on an evolution of emotion in response to a given web page, as well as offline in retail stores and other locations.

The functions 10A, 10B and 10C of the server 10 operate at least in part to assign an online association weight to each object (item) based upon the user's eye fixation duration on their images and videos, and a total fixation duration and number of cycles (formed by saccades and regressions) on descriptive text of the product, when the product is seen online such as on a web page or an application. The functions 10A, 10B and 10C of the server 10 also operate to assign a positive emotional weight to each object based upon a number of people who were happy (or, more specifically, experienced a positive emotion) while looking at the product, and the number of people whose emotional state evolved, e.g., turned happier (or, more positive) as they spent more time viewing the product image, text etc., as detected by the emotion detection subsystem. The value of the emotional weight can be computed as a sum of products of the number of persons experiencing positive emotion and the degree of positivity associated with each detected positive emotional state. The functions 10A, 10B and 10C of the server 10 can also operate to assign a negative emotional weight to objects.

The functions 10A, 10B and 10C of the server 10 can also operate at least in part to assign different weights to different products depicted on a given web page, if the web page has multiple products, based upon the time duration of focus the user spends on each product. In this case the weight of a given product can be determined, for example, as number of time units (seconds) that a user has focused on a given product. The product weight can be set to zero if the user's attention is shorter than some minimum threshold.

The functions 10A, 10B and 10C of the server 10 can also operate at least in part to assign an offline association weight to products identified (e.g., identified by brand, or by model, etc.) in physical stores, as seen through wearable items such the user interface devices 18 (e.g., the glasses worn by the user). This information can then in some embodiments be transferred from the user interface device 18 to a user browsing device 14, e.g., the user's smartphone or tablet, which in turn can transfer this information to the system 10 where it then can be used in a manner similar to an online association weight.

The embodiments of this invention as embodied in the system 1 can also track the gaze coordinates and attention span (using, for example, time stamps) of the user on a screen of a browsing device 14 (e.g., computer/tablet/laptop) using wearable glasses, e.g., the user interface device 18, and transfer in (soft) real time this information to a repository on the device 14. At some later time the data descriptive of the user's gaze coordinates and attention span can be transferred from the user's browsing device 14 via an input 16 to the system 10. The use of time stamps is beneficial for facilitating the evolution over time of the user's gaze and/or emotional response to, and thus interest in, displayed items/products.

The collaborative filtering function 10D of the server 10 can operate at least in part to identify those products that the user carefully looked at and spent more time with (higher online association weight and/or offline association weight), and had a higher happiness factor (i.e., a higher positive emotional weight and lower negative emotional weight), so as to score those products the highest and thereby increase the probability of these products being added to the secondary shopping cart by the function 10G. The collaborative filtering can involve, for example, marking a 0/1 value on weights relative to some given threshold.

The collaborative filtering function 10E of the server 10 can operate for other persons that have been identified as related/associated in some manner with the user. The collaborative filtering function 10E can perform an additional reordering of items by increasing weights of those items that have been viewed by social friends (online and/or offline).

In general the weights can be adjusted following one of many possible algorithms. By whatever procedure is employed it is desirable to favor those items that have evoked a higher degree of interest among social friends, compared to those having evoked a lower degree of interest, as found by eye tracking and other means. The weight will increase proportionately with the number of friends having interest in the product, their degree of interest and the positive emotional response evoked. In a non-limiting embodiment of this invention this can be expressed as a simple sum of products of eye gaze fixation count and duration of social friends' attention towards each product, times the friendship strength, etc.

In this manner a product added to the user's secondary shopping cart by the function 10G can be selected for addition based on both the user's reaction to the product and also the reaction of one or more other persons determined (e.g., from social media) to be associated in some manner with the user (e.g., family, friends, etc.)

A further aspect of the system 1 relates to providing a method to update the list of recommended products that can potentially be placed in the secondary shopping cart by the function 10G as the user spends more time on a given page, and based at least in part on the user's eye focus and evolution of emotions (positive or negative) indicating the user's evolving interest in different products.

One important goal of the system 1 and the function 10G, in cooperation with the functions 10A-10F, is to create the secondary (soft) shopping cart for a given user. The secondary shopping cart contains (more) highly rated items, and a straight forward click-to-add method can be used to select and move items from the secondary shopping cart into the primary shopping cart. This results in ease of check-out and provides the ability to cross-sell and up-sell products that the user has already shown emotional/cognitive attachment to and interest in.

The use of the embodiments of this invention provide a capability to perform implicit interest-based product recommendation, using in part collaborative and social filtering, where the interests are gauged at least in part based upon the eye tracking and emotional reaction of users to the products.

The use of the embodiments of this invention also provide a capability to bring user interest in a product that is captured offline (such as in a retail establishment) into an online recommendation paradigm (using, for example, collaborative filtering and social recommendations), and thereby create a cognitive filtering paradigm.

The use of the embodiments of this invention further provide a capability to update product recommendations (those products placed in the secondary shopping cart by the function 10G) dynamically over time, as a person browses through a session and the person's interest and engagement levels with products evolve (found by cognition, based upon eye tracking and emotion detection). The secondary shopping cart facilitates the speed and accuracy of the check-out process by helping the user to recall those items the user wanted to purchase or at least showed a positive interest in. The secondary shopping cart also enables provisioning the retail checkout system with the ability to cross-sell and up-sell products.

The system 1 thus enables the execution of methods to perform product recommendation based upon cognitive reactions of a viewer viewing a web page or a screen associated with an application. The methods include one or more of performing temporal collaborative filtering based upon the eye focus and eye movement behavior of the current user and/or temporal social filtering based upon the eye focus and eye movement behavior of social 'friends' of the current user regarding a product of potential interest, as well as user and user social 'friend' reactions observed offline in retail stores and other locations. These operations entail detecting the eye focus duration and the emotional reaction and evolution of emotional reaction of users to a given product on a screen displaying a web page or on a screen displaying an application or in a physical retail establishment. The embodiments can dynamically update the product recommendations as a viewer continues to view a product, a group of products, or a web page (or app page) for longer durations with or without evolving states of emotion.

An aspect of the embodiments of this invention is the creation of a soft secondary shopping cart for each viewer, based upon the viewer's cognitive behavior with respect to the products browsed. This enables providing an easy mechanism (such as a 'click-to-add' button) for the viewer to be able to easily add a product or products from the secondary shopping cart into the primary shopping cart thereby facilitating check-outs, cross-sells and up-sells.

It can be noted that the both the primary shopping cart and the secondary shopping cart can be considered as 'virtual' shopping carts that can be implemented in any desirable manner, including simply as displayed lists of user-selected items (primary shopping cart) and system-recommended items (secondary shopping cart).

The system 1 shown in FIGS. 1 and 2 embodies a number of interworking technical features and assets. The technical features and assets include a system/device to track the focus of the user's eye (fixation), and movements of the eyes (e.g., progressive and regressive saccades) on the screen of the user's browsing device 14, e.g., on the screen of the computer or tablet or mobile phone. Another feature and asset involves a method which, given eye focus coordinates (x,y) on the computer/tablet/mobile device screen, and the content shown on the screen, can map to a specific product the image/video/text (word, etc.) shown at that location on the screen. An optional feature and asset involves an emotion detection method that, given a human face, can detect the user's emotion from the image of the user's face in 'soft' real time (i.e., in human-scale time units of seconds as opposed to fractions of a second). Another optional technical feature and asset involves use of a wearable device (e.g., glasses, helmet, etc.) that can track the coordinate (x,y) on the computer/tablet/mobile device screen that the user's eye focuses on, and that can push/upload that information to the server 10 in soft real time. The wearable device can also be employed, for example, in a retail store environment to provide the server 10 with information concerning in-store products viewed by the user. Relatedly, another optional feature and asset involves providing a system/method to identify items from logos, bar codes, location (rack) in-store, etc., and to extract and input to the server 10 additional product-related information including, for example, brands and models.

The system 1 shown in FIGS. 1 and 2 can be configured to update those products recommended for a given user dynamically over time in response to the use continuing to look at a given displayed page (having one or more products). In other words, the system 1 can evolve the dynamic product recommendation(s) for the user as the user's browsing session ages, based upon the user's implicit cognitive (eye) behavior.

The system 1 shown in FIGS. 1 and 2 can also be configured to create the secondary shopping cart (function 10G) while the user browses one or more displayed pages each containing one or more products, and to present items from the secondary shopping cart for consideration by the user at least at check-out time.

The system 1 shown in FIGS. 1 and 2 can also be configured to capture a user's emotions/reactions to products in an offline environment (e.g., while the user shops in a retail establishment having physical products on display) and to include this user-related information as part of an online product recommendation process. This can be viewed as an aspect of cognitive filtering. In this case the user can be identified using, for example, some form of biometric recognition such as facial recognition so that the product-related data collected from the user in-store can be sent to the server 10 and associated with the user's data in the database 12.

Several non-limiting examples of the use of the system 1 in accordance with this invention will now be provided. The first use example is described in a web-to-web context. Assume for this example that a user (user_1) is browsing an online book retailer and is currently viewing a catalog page for mystery books (MBs). The page presents 10 mystery books (MB1-MB10); however, user_1 merely glances at eight of them (MB3-MB10) while more carefully looking into the other two books MB1 and MB2, and further spends a significant amount of time reading the reviews of both MB1 and MB2. The user_1 then clicks a link to move to a different page. The system 1 in response adds MB1 and MB2 to the secondary shopping cart of user_1 via operation of the server 10 functions 10A-10G. From the new page, and after several clicks, the user_1 eventually reaches a page that lists adventure books (ABs) that contains a book AB1. However, user_1 does not stay on this page for long and clicks to another adventure book page containing AB2 where user_1 spends some appreciable amount of time reading a review. User_1 then moves to a history book (HB) catalogue page. However, due to the detected focus of user_1 and the time that was spent reading the review of AB2 the server 10 also adds this book to the secondary shopping cart of user_1.

It so happens that several acquaintances of user_1 (who could be, by example, family, personal friends, social network friends, work associates, etc., of user_1) have also visited the online book retailer's web site. These friends are referred to for convenience as user_2, user_3 and user_4. Assume that previously user_2 had carefully looked at MB1, AB2 and AB6, that user_3 had carefully looked at MB1, MB2, MB3 and AB2 and that user_4 had carefully looked at MB1 and MB2, where 'carefully' implies that at least some threshold degree of eye focus and focus time has been exceeded.

Further, user_2 had looked at history books HB1 and HB7, user_3 had looked at HB5 and HB7 and user_4 had looked at HB5 and HB9. Also, user_2 had purchased MB1 and HB7, user_3 had purchased MB1, AB2 and HB7, and user_4 had purchased MB2 and HB5.

In general, assume that it has been observed that those customers or potential customers of the online retailer that have focused on the descriptions of MB1, MB2 and/or AB2 also tend to focus significantly at HB4 and HB7, and many of them end up purchasing HB5, HB7 and/or HB9. Assume then that at the bottom of the history book page user_1 is shown the following recommendations: "People who found (some or all of) the descriptions of MB1, MB2 and AB2 interesting, also found (some or all of) HB4 and HB7 interesting". The user_1 can also be informed that: "Your friends who found (some or all of) the descriptions of MB1, MB2 and BA2 interesting, also found (some or all of) HB5, HB7 and HB9 interesting", as well as: "People who bought (some or all of) MB1, MB2 and BA2, also bought (some or all of) HB5, HB7 and HB9", as well as "Your friends who bought (some or all of) MB1, MB2 and BA2, also bought (some or all of) HB5 and HB7". The user_1 may then carefully consider the mentioned (recommended) HB5, HB7 and HB9, and if so these three books are also added to the secondary shopping cart of user_1.

At the end of the browsing session user_1 finalizes his or her choices: among the past browsed books user_1 reaches a determination to purchase MB1 and HB5. While finalizing the purchase decision user_1 happened to be on the page of a thriller book TB3 and has chosen to buy it also. As a result TB3 is added to user_1's (primary) shopping cart, i.e., the set of items that the user has selected to purchase.

Now, and in accordance with embodiments of this invention, rather than needing to browse backwards or find/search for earlier choices, user_1 can choose to simply open a pop-up window associated with user_1's secondary shopping cart (which at this point in this example contains MB1, MB2, AB2, HB5, HB7 and HB9) and can then readily add, for example, MB1 and HB5 from the pop-up window to the primary shopping cart (e.g., a drag-and-drop operation can be employed) and proceed to final check out.

It can be noted that the use of the embodiments of this invention beneficially enables the system 1 to measure what can be referred to as the 'interest' of persons in certain items, rather than just detecting that some items were simply observed. This can be accomplished even if all items, books in this non-limiting example, are shown on the same page of an online catalog since the system 1 is quantifying the eye focus and the emotional state of the person.

A second use example is now described in a cross-channel context. Assume that during a visit to a physical retail book store user_1 spent considerable time looking at mystery books MB1 and MB2. This activity of user_1 was captured (and possibly stored) by wearable glasses (one of the user interface devices 18). The identities of MB1 and MB2 could be ascertained by the use of, as non-limiting examples, bar codes or optical character recognition. Alternatively an in-store camera system or systems, associated with MB1 and MB2 (e.g., rack mounted), could be employed to identify user_1 using, for example, facial recognition algorithms.

Furthermore, assume during a visit by user_4 (from the previous example) to the retail book store prior to user_1's visit that user_4 had also spent considerable time looking at mystery books MB1 and MB2 as detected by, for example, a near field communication (NFC) barcode sensor on a ring worn by user_4 (another one of the user interface devices 18).

Now assume during a subsequent visit to an online channel (app/web) of the retail book store that user_1 begins to look at AB2 and other books (as in the web-to-web embodiment discussed above). In the meantime, user_1's wearable glasses have wirelessly (e.g., Bluetooth) synchronized with user_1's web browsing device 14, and the identities of MB1 and MB2 are automatically sent from the glasses to the browsing device 14 and then to the server 10 where they are added to user_1's secondary shopping cart. In this example user_1 can then proceed to eventual checkout along the lines of the first (web-to-web) example give above. It can be noted that user_4 has also previously synchronized the wearable ring to user_4's browsing device 14, and the in-store (physical store) choices made by user_4 were also available for collaborative and social filtering while user_1 is making purchase decisions. This example shows that a user's consideration of items can occur in both a physical sense and in a virtual, online sense.

For the case where the in-store camera system has recognized user_1 and user_4 this information, along with information identifying those books that were carefully considered by user_I and user_4, can be directly transmitted from the in-store camera system to the server 10 that may be associated with the book retailer.

In yet another non-limiting example, presented in a temporally evolving context, assume that user_1 has been recommended books AB1, AB2 and AB3 as being 'interesting', similar to the foregoing embodiments, after useri has spent two minutes viewing the catalog. However, in this case user_1 then continues to view the catalog page for an additional minute. Based upon new books stared at (and user_1's detected emotional state possibly becoming "happier" while staring), as well as the additional time spent on the catalog page, the server 10 updates the recommendation section and now shows AB1 and AB4 as the 'interesting' books. AB1 and AB4 can then be added to the secondary shopping cart of user_1 with an increased priority, while AB2 and AB3 can be reduced in priority or they can be removed altogether from the secondary shopping cart if the detected interest levels for these items fall below those of the top K items, given that an optional maximum size of the secondary shopping cart in this non-limiting example is K items.

This third example thus illustrates that the server 10 can prioritize the items found in the secondary shopping cart based on, for example, a degree of the user's focus (e.g., intense eye focus vs. merely passing focus) and/or a length of time that the user considers a particular item and/or on the user's emotional state while viewing an item, e.g., those items associated with a more positive emotional state are assigned a priority in the secondary shopping cart that is greater (higher) than the priority assigned to items that elicit a less positive user emotional state. In general, member items of the set of items in the supplemental shopping cart can comprise items that are prioritized in accordance with at least a detected degree of interest exhibited by the user when viewing items.

The priorities of items in the secondary shopping cart can also be influenced by choices made by and behaviors of other persons that are socially connected in some manner with the user.

Figure 3:
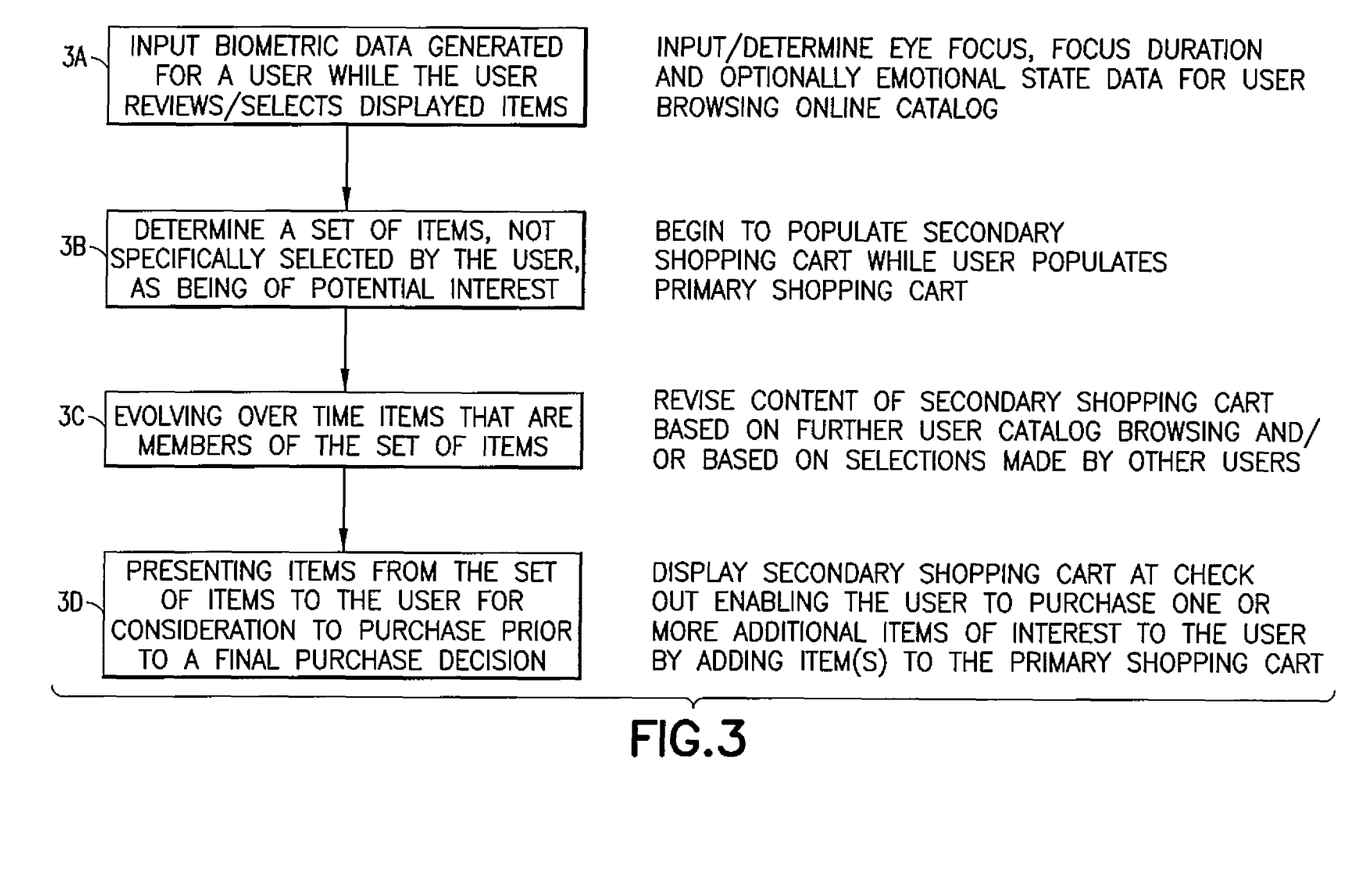
FIG. 3 is a logic flow diagram that shows an embodiment of a method in accordance with the embodiments of this invention.

Reference is now made to FIG. 3 for illustrating a logic flow diagram showing an embodiment of a method in accordance with the embodiments of this invention. At Block 3A there is an operation or step of inputting to a data processing system biometric data generated for a user in an environment wherein the user selects one or more displayed items for purchase. The biometric data can include at least eye-related data such as gaze tracking and/or eye focus data. The biometric data can represent the user's eye focus coordinates as well as temporal information related to duration of the eye focus. The biometric data can also include, for example, data descriptive of an emotional state of the user (e.g., data obtained from an analysis of the user's face). The biometric data can also represent other information descriptive of the user while the user is engaged with an item, either a physical item or an image of an item and/or information descriptive of the item. At Block 3B there is an operation or step of operating the data processing system to determine a set of items comprised of at least one member item, not specifically selected to purchase by the user, as being of potential interest to the user when the user makes a final purchase decision. At Block 3C there is an operation or step of evolving over time items that are members of the set of items in response to continued reception of the biometric data. At Block 3D there is an operation or step of presenting member items from the set of items to the user for consideration to purchase prior to the user making the final purchase decision.

In the method shown in FIG. 3, where the displayed items can be items displayed in a physical store, where the biometric data is conveyed, to the data processing system 1 via a user electronic device 14.

In the method shown in FIG. 3, where the displayed items are items displayed on a screen of the user electronic device 14, where the biometric data is conveyed to the data processing system 1 from the user electronic device.

In the method shown in FIG. 3, where the biometric data can be comprised of at least one of user eye movement related data such as saccades and regressions, as well as user emotional state data.

In the method shown in FIG. 3, where the displayed items can be items displayed on a screen of the user electronic device 14, where a user selected item to purchase is placed by the user into a virtual primary shopping cart, and where the member items from the set of items are placed by the data processing system into a virtual secondary shopping cart. In this case the method can also include displaying the virtual secondary shopping cart to the user when the user begins a check out procedure to purchase items in the virtual primary shopping cart and, responsive to the user, moving a user-selected item from the displayed virtual secondary shopping cart to the virtual primary shopping cart.

In the method shown in FIG. 3, where in response to the user selecting one or more displayed items for purchase the method further comprises informing the user of related item preferences expressed by one or more other users that are known to the user.

In the method shown in FIG. 3, where member items of the set of items comprise items found in an online virtual store catalog displayed on a screen of the browsing device 14 of the user and viewed by the user, and where at least one member item of the set of items comprises an item viewed by the user with a user interface device 18 in a physical store, wherein the user viewing the items generates at least a portion of the received biometric data.

The present invention may be embodied as a system, a method and/or as a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method, comprising:
inputting to a data processing system biometric data generated for a user in an environment wherein the user selects one or more displayed items for purchase, where the biometric data is comprised of at least eye-related data of the user, wherein the displayed items are items displayed on a screen of a user electronic device, where a user selected item to purchase is placed by the user into a virtual primary shopping cart;
operating the data processing system to determine a set of items, not selected to purchase by the user the operating comprising the data processing system receiving from the user electronic device, a user's gaze coordinates and mapping the received gaze coordinates to a spatial location of an object displayed on the screen of the user electronic device and determining at least eye focus duration of the user on objects displayed on the screen of the user electronic device to determine which objects have been examined based at least on how long the user maintained his or her eyes focused on the objects, and placing or not placing the examined objects into a virtual secondary shopping cart based on a threshold of eye focus duration associated with the examined objects, and where the examined objects placed into the virtual secondary shopping cart form at least part of the set of items;

evolving over time items that are members of the set of items in response to continued reception of the biometric data, wherein the evolving over time comprises determining the user's eye focus duration associated with the examined objects over time and removing based on corresponding thresholds for the eye focus duration examined objects from or adding examined objects to the virtual secondary shopping cart based on the user's eye focus duration associated with the examined objects over time; and presenting at least a portion of the virtual secondary shopping cart to the user for consideration to purchase prior to the user making the final purchase decision using the virtual primary shopping cart.

2. The method as in claim 1, where the biometric data is conveyed to the data processing system from the user electronic device.

3. The method as in claim 1, where the biometric data is comprised of at least one of user eye movement related data and user emotional state data.

4. The method as in claim 1, further comprising:
displaying the virtual secondary shopping cart to the user in response to the user beginning a check out procedure to purchase items in the virtual primary shopping cart; and
responsive to the user, moving a user-selected item from the displayed virtual secondary shopping cart to the virtual primary shopping cart and proceeding to final checkout responsive to the final purchasing decision by the user.

5. The method as in claim 1, where in response to the user selecting one or more displayed items for purchase the method further comprises informing the user of related item preferences expressed by one or more other users that are known to the user.

6. The method as in claim 1, where member items of the set of items comprise items found in an online virtual store catalog displayed on the screen of the electronic device of the user and viewed by the user, and where at least one member item of the set of items comprises an item viewed by the user in a physical store, wherein the user viewing the items generates at least a portion of the received biometric data.

7. The method as in claim 1, where member items of the set of items comprise items that are prioritized in accordance with at least a detected degree of interest exhibited by the user when viewing items.

8. The method as in claim 1,
where member items of the set of items comprise items that are based on temporally evolving eye focus of other users.

9. A system, comprised of at least one data processor connected with at least one memory that stores software instructions, where execution of the software instructions by the at least one data processor causes the system to:
input biometric data generated for a user in an environment wherein the user selects one or more displayed items for purchase, where the biometric data is comprised of at least eye-related data of the user, wherein the displayed items are items displayed on a screen of a user electronic device, where a user selected item to purchase is placed by the user into a virtual primary shopping cart;

determine a set of items, not selected to purchase by the user, the operating comprising the data processing system receiving from the user electronic device, a user's gaze coordinates and mapping the received gaze coordinates to a spatial location of an object displayed on the screen of the user electronic device and determining at least eye focus duration of the user on objects displayed on the screen of the user electronic device to determine which objects have been examined based at least on how long the user maintained his or her eyes focused on the objects, and placing or not placing the examined objects into a virtual secondary shopping cart based on a threshold of eye focus duration associated with the examined objects, and where the examined objects placed into the virtual secondary shopping cart form at least part of the set of items;

evolve over time items that are members of the set of items in response to continued reception of the biometric data, wherein the evolving over time comprises determining the user's eye focus duration associated with the examined objects over time and removing based on corresponding thresholds for the eye focus duration examined objects from or adding examined objects to the virtual secondary shopping cart based on the user's eye focus duration associated with the examined objects over time; and present at least a portion of the virtual secondary shopping cart to the user for consideration to purchase prior to the user making the final purchase decision using the virtual primary shopping cart.

10. The system as in claim 9, where the biometric data is conveyed to the system from the user electronic device.

11. The system as in claim 9, where the biometric data is comprised of at least one of user eye movement related data and user emotional state data.

12. The system as in claim 9, where the system is further configured to display the virtual secondary shopping cart to the user in response to the user beginning a check out procedure to purchase items in the virtual primary shopping cart and, responsive to the user, to move a user-selected item from the displayed virtual secondary shopping cart to the virtual primary shopping cart and proceeding to final checkout responsive to the final purchasing decision by the user.

13. The system as in claim 9, where in response to the user selecting one or more displayed items for purchase the system is configured to inform the user of related item preferences expressed by one or more other users that are known to the user.

14. The system as in claim 9, where member items of the set of items comprise items found in an online virtual store catalog displayed on the screen of the electronic device of the user and viewed by the user, and where at least one member item of the set of items comprises an item viewed by the user in a physical store, wherein the user viewing the items generates at least a portion of the biometric data that is received by the system.

15. A computer program product comprised of software instructions on a computer-readable medium, where execution of the software instructions using a data processing system results in performing operations comprising:
inputting to the data processing system biometric data generated for a user in an environment wherein the user selects one or more displayed items for purchase, where the biometric data is comprised of at least eye-related data of the user, wherein the displayed items are items displayed on a screen of a user electronic device, where a user selected item to purchase is placed by the user into a virtual primary shopping cart;

operating the data processing system to determine a set of items, not selected to purchase by the user, the operating comprising the data processing system receiving from the user electronic device, a user's gaze coordinates and mapping the received gaze coordinates to a spatial location of an object displayed on the screen of the user electronic device and determining at least eye focus duration of the user on objects displayed on the screen of the user electronic device to determine which objects have been examined based at least on how long the user maintained his or her eyes focused on the objects, and placing or not placing the examined objects into a virtual secondary shopping cart based on a threshold of eye focus duration associated with the examined objects, and where the examined objects placed into the virtual secondary shopping cart form at least part of the set of items;

evolving over time items that are members of the set of items in response to continued reception of the biometric data, wherein the evolving over time comprises determining the user's eye focus duration associated with the examined objects over time and removing based on corresponding thresholds for the eye focus duration examined objects from or adding examined objects to the virtual secondary shopping cart based on the user's eye focus duration associated with the examined objects over time; and presenting at least a portion of the virtual secondary shopping cart to the user for consideration to purchase prior to the user making the final purchase decision using the virtual primary shopping cart.

16. The computer program product as in claim 15, where the biometric data is comprised of at least one of user eye movement related data and user emotional state data, and the biometric data is conveyed to the data processing system via the user electronic device, and where at least some of the displayed items are items displayed on a screen of the user electronic device and the biometric data is conveyed to the data processing system from the user electronic device.

17. The computer program product as in claim 15, further comprising operations of:
displaying the virtual secondary shopping cart to the user in response to the user beginning a check out procedure to purchase items in the virtual primary shopping cart; and responsive to the user, moving a user-selected item from the displayed virtual secondary shopping cart to the virtual primary shopping cart and proceeding to final checkout responsive to the final purchasing decision by the user.

18. The computer program product as in claim 15, where in response to the user selecting one or more displayed items for purchase a further operation that is executed comprises informing the user of related item preferences expressed by one or more other users that are known to the user.

19. The computer program product as in claim 15, where member items of the set of items comprise items found in an online virtual store catalog displayed on the screen of the electronic device of the user and viewed by the user, and where at least one member item of the set of items comprises an item viewed by the user in a physical store, wherein the user viewing the items generates at least a portion of the received biometric data.

20. The computer program product as in claim 15, where member items of the set of items comprise items that are prioritized in accordance with at least a detected degree of interest exhibited by the user when viewing items.

* * * * *